June 28, 1938.  L. K. LOEHR ET AL  2,121,974
AUTOMATIC STARTING SYSTEM FOR ENGINES
Filed Oct. 29, 1928  3 Sheets-Sheet 1
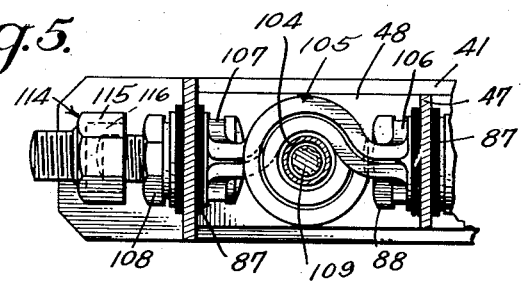
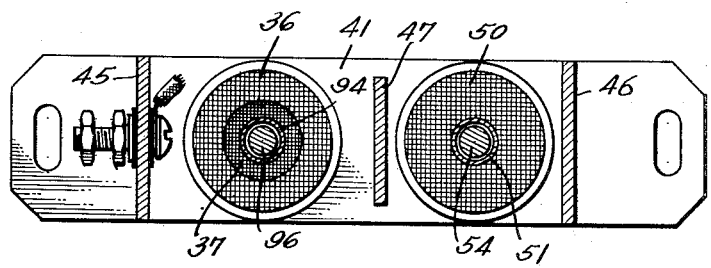
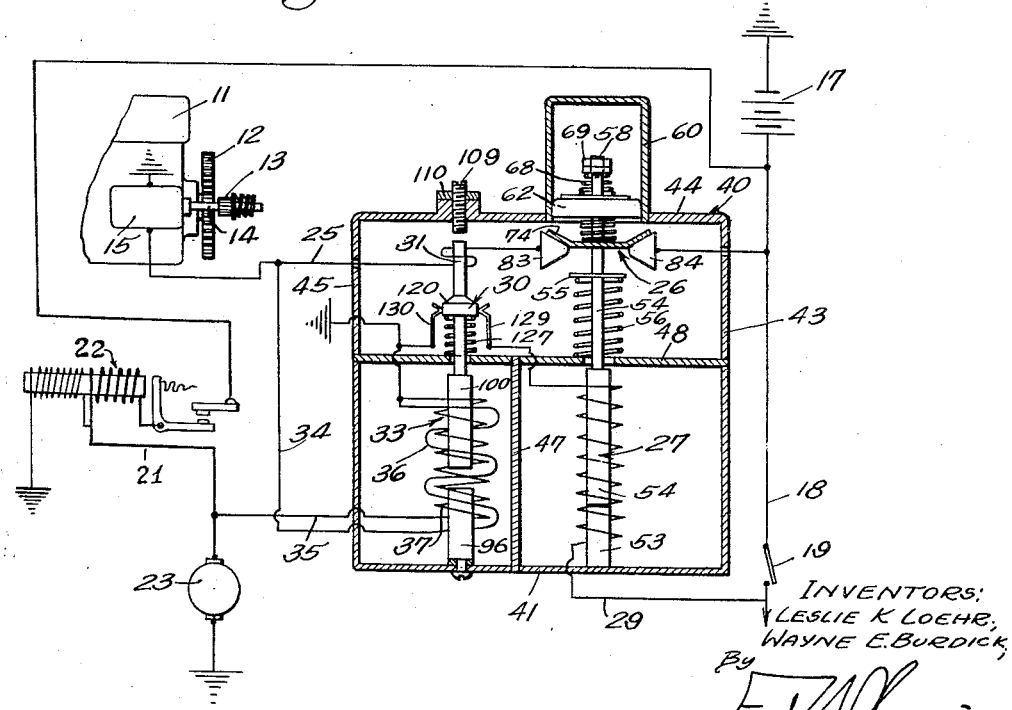
INVENTORS:
LESLIE K LOEHR,
WAYNE E. BURDICK,
By
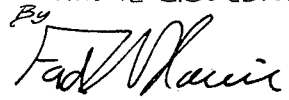
ATTORNEY.

June 28, 1938.　　　L. K. LOEHR ET AL　　　2,121,974
AUTOMATIC STARTING SYSTEM FOR ENGINES
Filed Oct. 29, 1928　　　3 Sheets-Sheet 2
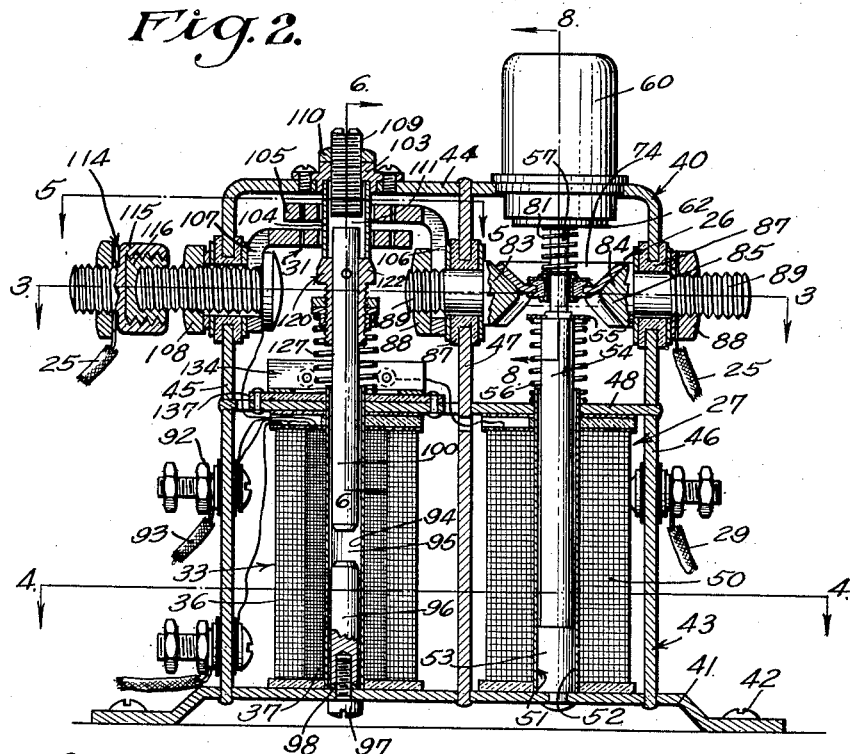
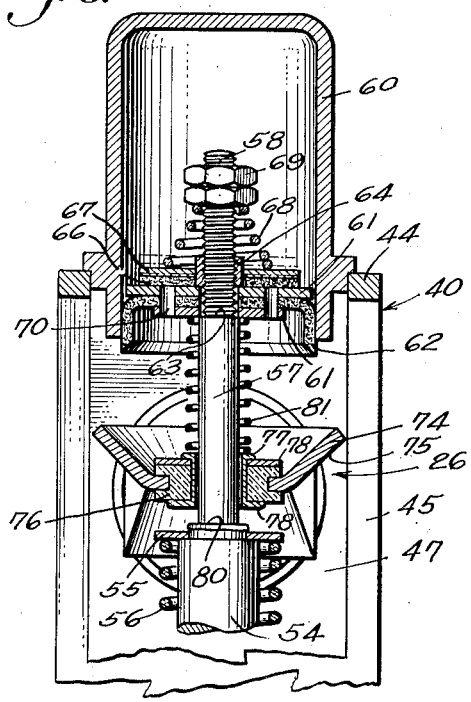
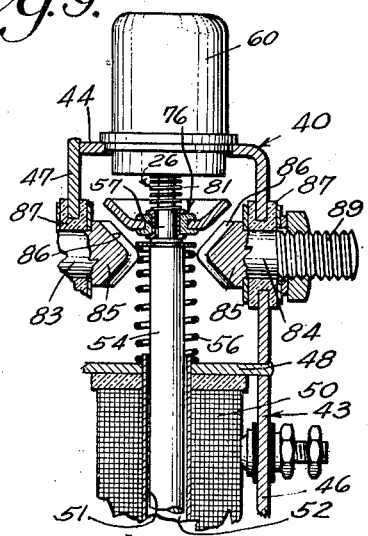
INVENTORS:
LESLIE K. LOEHR,
WAYNE E. BURDICK,
BY
ATTORNEY.

June 28, 1938.  L. K. LOEHR ET AL  2,121,974
AUTOMATIC STARTING SYSTEM FOR ENGINES
Filed Oct. 29, 1928  3 Sheets-Sheet 3
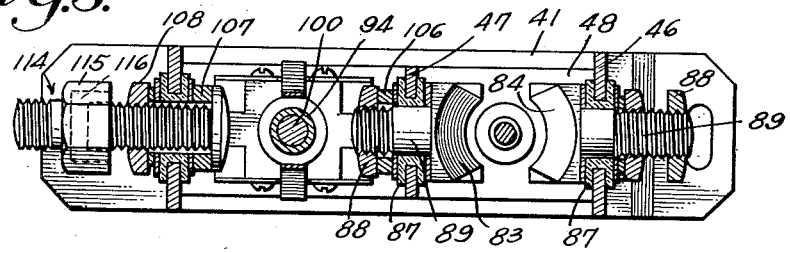
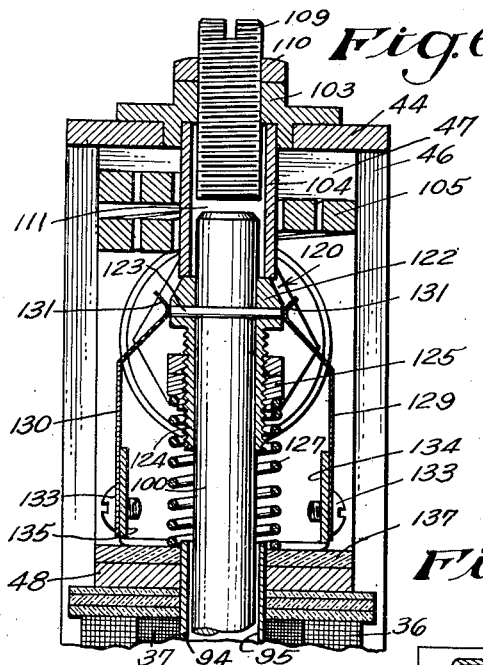
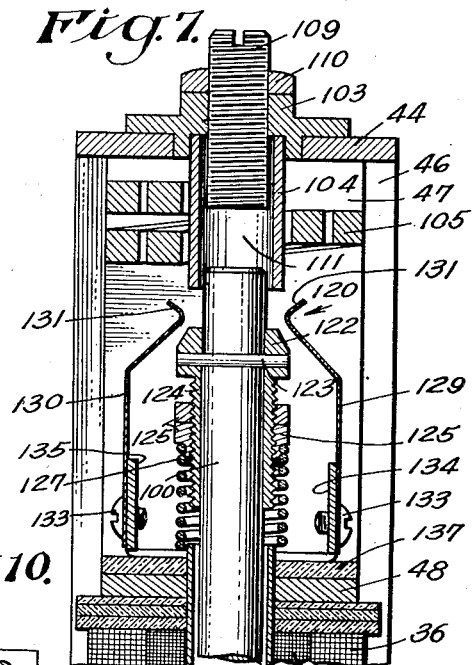
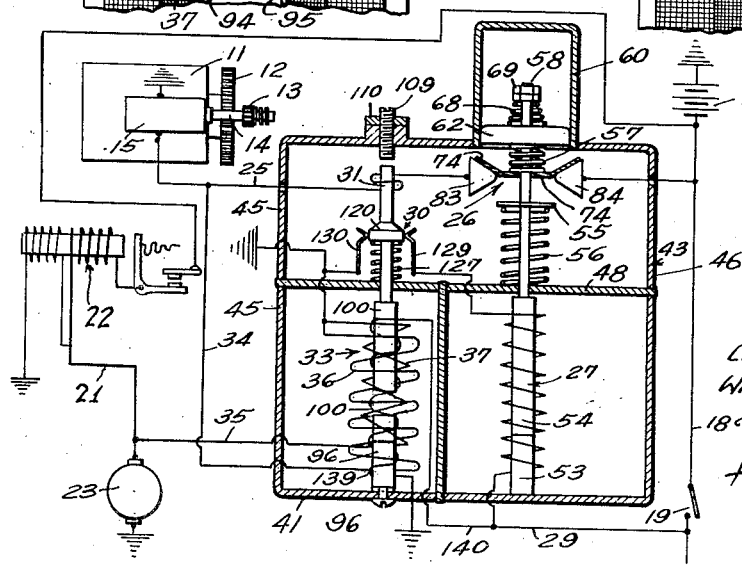
INVENTORS:
LESLIE K. LOEHR,
WAYNE E. BURDICK,
By
ATTORNEY.

Patented June 28, 1938

2,121,974

UNITED STATES PATENT OFFICE

2,121,974

AUTOMATIC STARTING SYSTEM FOR ENGINES

Leslie K. Loehr and Wayne E. Burdick, Los Angeles, Calif., assignors to The Startomatic Corporation, a corporation of Nevada Application October 29, 1928, Serial No. 315,620

49 Claims. (Cl. 290—36)

Our invention relates to automatic starting means for engines, and is particularly useful in automotive vehicles. Not only do we believe that the general combination of our invention is new and patentable, but we also believe that considerable patentable merit is present in various combinations and sub-combinations and details of construction which contribute to the invention in its entirety.

Our invention is not limited to the automotive industry, but since one of its prominent uses is in that industry, for the purpose of explaining to those skilled in the art the details of our invention, we shall describe our invention in connection with its use on automobiles; without, however, having any intention to limit the invention thereto.

In order that the advantages of our invention may be readily understood, we shall briefly refer to the starting equipment of an automobile.

The ignition of an automobile is energized by closing a manually operable ignition switch which closes the ignition circuit. In order to start the engine it must be cranked either by hand or by a starting motor connected to the engine. This ordinarily is done by closing a starting-motor switch which closes the starting motor circuit, thus energizing the starting motor and cranking the engine. When the engine is cranked and operates under its own power, the starting-motor switch must be quickly opened so that the starting motor will not spin.

Whenever the engine stalls, it is necessary to close the starting-motor switch in order to again crank the engine. The starting-motor switch is usually operated by the right foot, which also operates the foot pedal which operates the service brakes. When the engine stalls, leaving the automobile in a dangerous position such as on a steep grade, or in a precarious position such as on a railroad crossing, or in a position embarrassing to the operator, such as on a busy thoroughfare crossing, usually the operator becomes confused and excited because of the pressure of the situation, and generally there is some delay in getting the engine started.

It is an object of our invention to provide a mechanism for automatically cranking an engine when the ignition switch is turned on, or when the engine stalls.

Another object of our invention is to provide an automatic cranking means of this character in which the starting motor or equivalent cranking element is disconnected from the engine when the engine is operating under its own power.

A still further object of the invention is to provide a cranking mechanism which cannot be actuated when the engine is operating under its own power.

A still further object of our invention is to provide an automatic cranking mechanism in which the current produced by the starting motor during deceleration is utilized to disconnect the cranking mechanism from the engine.

It is an object of our invention to provide a cranking mechanism for an engine in which the starting motor is maintained disconnected from the source of energy by a means which uses the assistance of the starting motor for maintaining the starting motor disconnected from the source of energy.

Another object of the invention is to provide a combination of the character mentioned in which the means for maintaining the starting motor disconnected from its source of energy utilizes the electro-motive force produced by the starting motor during its deceleration.

It is an object of our invention to provide a cranking mechanism for an engine in which the starting motor is connected to or disconnected from the source of energy during the cranking of the engine, in which means is provided for disconnecting the starting motor from the source of energy when the engine operates under its own power, and in which said means is operated by a current generated by said starting motor during deceleration.

Another object of the invention is to provide a cranking mechanism of the character mentioned including a starting-motor circuit switch for opening and closing the starting-motor circuit, means for holding the switch closed, and a means for opening the switch after the engine is operating under its own power, this last-named means operating on a current taken from the starting-motor circuit.

Another object of the invention is to provide a combination as specified in the preceding paragraph in which the means for opening the switch after the engine is operating under its own power, utilizes current produced by the starting motor.

A still further object of the invention is to provide a mechanism for cranking an engine which includes closing electro-responsive means for holding the starting-motor circuit switch closed during the cranking of the engine, and opening electro-responsive means for opening the switch after said engine is operating under its own power, the opening electro-responsive means being operated by current taken from the starting-motor circuit.

Another object of the invention is to provide a cranking mechanism of the character described in which the opening electro-responsive means is operated to hold the switch open by a current produced by the starting motor.

It is another object of the invention to provide a cranking mechanism of the character mentioned having an electro-responsive means for opening and closing the starting-motor circuit switch, a second circuit embracing this electro-responsive means and a source of energy, and which includes means for opening and closing the second circuit in order to operate the electro-responsive means so as to open and close the switch, and means utilizing the current generated by the starting motor for holding the second circuit open.

A still further object of the invention is to provide a cranking mechanism of the character described which includes an electro-responsive means for opening and closing the starting-motor circuit switch, a second circuit embracing the electro-responsive means and a source of energy and which includes a closing electro-responsive means for holding said second circuit closed during the cranking of the starting motor, and an opening electro-responsive means for opening the second circuit after the engine is operating under its own power, the opening electro-responsive means being operated by current taken from said starting-motor circuit and by current produced by the starting motor during its deceleration.

A further object of our invention is to provide an automatic switching mechanism for the starting motor of an internal combustion engine, which mechanism embodies means adapted to delay the closing of the starting-motor circuit in relation to the rotative condition of the said engine and said means being actuated by virtue of the deceleration of said starting motor.

Another object of our invention is to provide an automatic switching mechanism for the starting motor of an internal combustion engine, which mechanism embodies a means adapted to delay the closing of the starting-motor circuit which means functions independent of the rotative condition of said engine and said starting motor.

Other objects and the advantages of our invention will be pointed out in the following description.

Referring to the drawings in which our invention is illustrated,

Fig. 1 is a diagram showing the complete invention.

Fig. 2 is a vertical section through certain novel control mechanisms which embodies important features of our invention.

Figs. 3, 4, 5, and 6 are sections taken as indicated by the corresponding lines of Fig. 2.

Fig. 7 is a view similar to Fig. 6, but showing the parts in a different position.

Fig. 8 is a section taken on the line 8—8 of Fig. 2.

Fig. 9 is a section similar to Fig. 8 showing the parts in a different position.

Fig. 10 is a diagram showing an alternative form of our invention.

Before going into the details of construction of the invention, we shall first briefly point out the general combination so that the reader will have a general idea of the combination which our invention provides, and will then be in a better position to readily grasp the detailed explanation which will follow.

Referring first to Fig. 1, the numeral 11 represents an engine. This engine may be an automobile engine or any other engine, preferably of the internal combustion type. The engine 11 has a starting gear 12 which may be engaged and rotated by a Bendix gear 13 carried on a shaft 14 of a starting motor 15. The numeral 17 represents a source of energy in the form of a battery and connected to the battery 17 is an ignition circuit 18 having an ignition switch 19. The ignition circuit 18 supplies electric current to the ignition of the engine 11. Connected to the battery 17 by means of a generator circuit 21 having a reverse current relay 22 is a generator 23. The generator 23 is connected to the engine 11 so that when the engine 11 is operating under its own power the generator 23 generates a current which recharges the battery 17.

Connected to the battery 17 and the starting motor 15 is a starting-motor circuit 25 having a starting-motor switch 26 which must be closed before the starting motor 15 can be actuated. For the purpose of closing the starting-motor circuit switch 26, we provide an electro-responsive means 27 which is included in a second circuit 29. When the second circuit 29 is completed, the starting-motor switch 26 will be closed and the starting motor 15 will be energized.

The second circuit 29 includes a second circuit switch 30 which must be closed or else the electro-responsive means 27 cannot be energized. For the purpose of maintaining the second circuit switch 30 in closed position, we provide a closing electro-responsive means 31, and for the purpose of opening the second circuit switch 30 after the engine 11 has been cranked and is operating under its own power, we provide an opening electro-responsive means 33. The opening electro-responsive means 33 is energized by a starting-motor shunt circuit 34 and by a generator shunt circuit 35 which include respectively a starting-motor shunt coil 36 and a generator shunt coil 37.

We shall now refer to Figs. 2 to 9 inclusive and explain the details of construction of the parts of the invention which are new in themselves, and which cooperate with the general combination illustrated in Fig. 1 to produce a new combination.

Referring particularly to Fig. 2, the numeral 40 represents a frame which is preferably made from iron. The frame 40 has an iron base 41 through which screws 42 may be extended for securing the assembly in place. Connected to the base 41 in any suitable manner such as by riveting, is an inverted U-shaped member 43 providing a top wall 44 and side walls 45 and 46. The frame 40 has a vertical partition 47 and a horizontal partition 48, both of which are made from iron and which divide the frame into four rectangular openings.

Secured in the lower right hand corner of the frame 40 is the electro-responsive means 27 of the invention. The electro-responsive means 27 includes a coil 50 which is connected in the second circuit 29. Extending through the coil 50 is a brass tube or sheath 51 which forms a central opening 52. Secured in the lower end of the opening 52 is a stationary core 53 and slidable in the upper part of the opening 52 is a movable core or plunger 54. Connected to the upper end of the plunger 54 is a disc 55 which compresses a spring 56 between itself and the partition 48. The purpose of the spring 56 is to resiliently maintain the plunger 54 in a raised position as illustrated in Fig. 9. When the coil 50 is energized, the plunger 54 is pulled downward against the action of the spring 56 and into the position shown in Fig. 2 so that it engages the stationary core 53.

Extending upward from the upper end of the plunger 54 is a stem 57. The upper end of the stem 57 is threaded at 58 and projects into a cylinder 60, the lower end of which is open. The cylinder 60 is secured in a suitable manner to the top wall 44 of the frame 40. Placed on the threaded end 58 of the stem 57 is a pair of washers 61 between which a cup-leather 62 is placed. This assembly is secured against a shoulder 63 of the stem 57 by means of a nut 64. Surrounding the stem 57 above the washer and cup-leather assembly is a valve assembly consisting of a pliable valve disc 66 and a plate 67. The valve assembly is urged against the upper washer 61 by a compression spring 68, the compression of which may be adjusted by an adjustment of nuts 69 threaded onto the upper threaded end 58 of the stem 57. The valve assembly is adapted to close openings 70 formed through the washers 61 and the cup-leather 62.

This mechanism just described constitutes the time element which controls the speed at which the starting-motor circuit switch 26 is closed. The speed at which the plunger 54 moves downward is governed by the amount of air which passes through the openings 70. If there is considerable tension on the spring 68, a greater difference in air pressure on the upper and lower sides of the valve assembly will be required to remove the valve assembly from closing position; consequently the plunger 54 will move downward slower than it would if there were but a slight compression on the spring 68 such as would permit the valve assembly to be removed from closing position by but a small difference in pressure.

The stem 57 carries a contactor 74 which forms a part of the starting-motor circuit switch 26. Preferably the contactor 74 is cup-shaped and provided with a frusto-conical engaging face 75. The contactor 74 is held by an insulation bushing 76 carried by a sleeve 77 between the edge plates 78. The sleeve 77 is slidable on the stem 57 and is ordinarily held resiliently against a shoulder 80 by means of a compression spring 81 engaging the upper end of the sleeve 77 and the lower face of the lowest washer 61. Secured to the upper parts of the wall 46 and the partition 47 of the frame 40 on a horizontal axis are contact members 83 and 84 which comprise a part of the starting-motor circuit switch 26.

The contact members have heads 85 provided with upper frusto-conical faces 86 adapted to be contacted by the frusto-conical face 75 of the contactor 74. The contact members 83 and 84 are insulated from the wall 46 and the partition 47 by suitable insulation bushings 87, and are rigidly secured in place by nuts 88 which are screwed onto threaded ends 89 of the contact members. As illustrated best in Fig. 1, the contact members 83 and 84 are connected in the starting-motor circuit 25.

Arranged in the lower left hand corner of the frame 40 is an opening electro-responsive means 33. The opening electro-responsive means consists of a cylindrical member 91 embodying the starting-motor shunt circuit coil 36 and the generator shunt coil 37 which are connected in the circuits 34 and 35 as illustrated in Fig. 1. These two coils 36 and 37 are connected to a ground terminal 92 which may be grounded by a wire 93 to a suitable part of the engine or its supporting structure.

Formed through the cylindrical member 91 inside the generator shunt coil 37 is a brass tube or sheath 94 providing a central vertical opening 95. Secured in the lower part of the opening 95 is a stationary core 96 which is secured in place by a screw 97. Placed between the lower end of the stationary core 96 and the base 41 is a washer 98 which is made of brass or some other nonmagnetic material. The screw 97 is also made of brass or some other nonmagnetic material. The purpose of this arrangement is to provide an air gap between the stationary core 96 and the base 41 and partition 47 which form a part of the magnetic circuit for the opening electro-responsive means 33.

Slidable in the upper part of the opening 95 is a movable core or plunger 100 which is adapted to be moved downward from the positions shown in Figs. 1 and 6 into the position shown in Fig. 7 when the opening electro-responsive means 33 is energized. When the plunger 100 is in its lowest position, the lower end thereof engages the upper end of the stationary core 96, thus making the two parts a single core and greatly increasing the effect of the magneto-motive force.

Secured to the top wall 44 of the frame 40 concentrically above the plunger 100 is a bushing 103. The bushing 103 carries a nonmagnetic sleeve 104 which extends downward and is adapted to surround the upper end of the plunger 100. Surrounding the nonmagnetic sleeve 104 is a coil 105 which forms a part of the closing electro-responsive means 31. The upper part of the plunger 100 constitutes another part of the closing electro-responsive means. The coil 105 has an arm 106 which is connected to the contact member 83 and has an arm 107 which is connected to a terminal 108, this terminal 108 being connected in the starting-motor circuit 25. Threadedly supported by the bushing 103 is an adjustable core 109 which may be locked in a determined position by a lock nut 110. The purpose of making the core 109 adjustable is to vary the air gap 111 between the lower end thereof and the upper end of the plunger 100 so that the pull of the magnetic force on the plunger 100 may be varied.

For the purpose of protecting the starting motor and various units connected in circuit therewith, we provide a fuse link 114 which is connected to the terminal 108 and to which one of the wires of the starting-motor circuit 25 is connected. The fuse link 114 consists of a body 115 providing a chamber which contains a filler 116 of an alloy having a low melting point. The end of the terminal 108 is screwed into the alloy filler 116. If the starting-motor circuit 25 is closed and the starting motor fails to function for some reason or another, the alloy filler 116 will melt and break the circuit before any damage is done to any of the parts.

Secured to the upper part of the plunger 100 a short distance below the upper end thereof is a contactor 120 which forms a part of the second circuit switch 30. The contactor 120 has a head 122 through which a pin 123 extends for securing it in place. The head 122 is adapted to engage the lower end of the sleeve 104 in order to determine the upper position of the plunger 100.

The lower end of the contactor 120 is in the form of a cylindrical extension 124 and is externally threaded to receive nuts 125. The nuts 125 are adapted to compress a spring 127, which spring 127 operates to resiliently maintain the plunger 100 and the parts associated therewith in the position illustrated in Figs. 1, 2, and 6.

Also forming a part of the second circuit switch 30 are contact fingers 129 and 130, the upper ends 131 of which are adapted to be engaged by the head 122 of the contactor 120 when the plunger 100 is in raised position. The contact fingers 129 and 130 are secured by screws 133 to supports 134 and 135 respectively. The supports 135 are carried by an insulation plate 137 which rests on the horizontal partition 48. It will be noted that the upper end of the brass or nonmagnetic tube 95 extends through the insulation plate 137 as well as through the partition 48, and it will be noted that the spring 127 at its lower end engages the insulation plate 137. The contact fingers 129 and 130 are connected in the second circuit 29 as illustrated in Fig. 1. The grounded end of the second circuit 29 may be connected to the ground terminal 92 as shown in Fig. 2.

In the form of the invention illustrated in Fig. 10, the construction may be identical with the exception of the following addition: Surrounding the stationary core 96 and the lower part of the plunger 100 is a demagnetizing coil 139 which is connected in a demagnetizing-coil circuit 140. One side of the circuit 140 is grounded and the other side is connected to the second circuit 29. The purpose of the demagnetizing coil 139 is to demagnetize the magnetic circuit of the opening electro-responsive means 33 whenever it is not supplied with current tending to magnetize it. The circuit 140 is connected to the source of energy whenever the ignition switch 19 is closed.

We shall now explain the operation of the invention illustrated in Figs. 1 to 9 inclusive. When it is desired to crank the engine 11, the ignition switch 19 is closed and energy is supplied to the ignition of the engine. At this time the starting-motor circuit switch 26 is opened by reason of the action of the spring 56, and the second circuit switch 30 is closed by the action of the spring 127. When the ignition switch 19 is closed, the second circuit 29 is also closed. A current flows through the second circuit and energizes the electro-responsive means 27. The magneto-motive force produced in the magnetic circuit formed by the cores and various parts of the frame 40, operates to pull the plunger 54 downward against the action of the time element. The time element, as previously explained, controls the rate of speed at which the plunger 54 moves downward. As previously pointed out, by adjusting the nuts 69 the speed at which the plunger 54 may be pulled downward can be varied. As the plunger 54 is pulled downward from raised position as shown in Fig. 9 into depressed position as shown in Figs. 2 and 8, the pull on the plunger increases and the speed at which the plunger travels also increases. The plunger moves downward into the position shown in Figs. 2 and 6, but before it reaches this position the contactor 74 moves into engagement with the heads 85 of the contact members 83 and 84. There is at this time a relative movement between the contactor 74 and the plunger 54 with the result that the spring 81 is compressed. The action of the spring 81 against the sleeve 77 which supports the contactor 74, resiliently holds the contactor 74 in closed position.

As just pointed out, as the plunger 54 moves toward depressed position its rate of travel increases. The advantage of this is that when the contactor 74 is approaching its seat on the heads 85, it is moving rather fast so that arcing between these parts of the starting-motor switch 26 will be reduced to a minimum.

When the starting-motor switch is closed, the starting-motor circuit 25 is completed and current is supplied to the starting motor 15. Since the resistance of the starting motor, which is of the series wound type, varies inversely as the speed thereof, it is evident that a greater amount of current is consumed during the cranking of the engine than in the case of the starting motor spinning freely. Therefore, during the cranking the low resistance of the starting motor 15 causes a heavy current to flow through the starting-motor circuit 25 and through the coil 105 energizing the upper end of the plunger 100, and the adjusting screw 109 causes a heavy magnetic pull to be exerted on the said plunger 100 through the air gap 111. Simultaneously with the flow of current through the starting-motor circuit 25, a current also flows through the starting-motor shunt circuit 34 into the coil 36, creating a pull on the plunger 100 in opposition to the pull created by the coil 105 and the spring 127. When a heavy current is caused to flow from the battery, such as the current consumed by a starting motor in cranking the engine, a drop in voltage of the said battery occurs, which drop varies in proportion to the current consumed. It is now evident that during cranking a slightly lesser current passes through the circuit 34 into the coil 36 than would be the case should the normal voltage of the battery be impressed across the said coil 36.

Upon the closing of the starting-motor circuit switch 26, the starting motor is operated and the Bendix gear 13 moves into engagement with the gear 12, thereby cranking the engine. At this time the coil 105 of the closing electro-responsive means 31 produces a strong magnetic pull upward on the plunger 100 at the same time current passing through the starting-motor shunt circuit 34 and the starting motor shunt coil 36 produces a magnetic pull downward on the plunger 100. This pull, however, is insufficient to overcome the action of the spring 127 and the strong pull created by the closing electro-responsive means 31.

When the engine 11 is started, the Bendix gear 13 disconnects from the gear 12 and the starting motor will be without load and will therefore spin freely at a comparatively high rate of speed. Since the current consumed by the starting motor varies inversely as the speed thereof, it is evident that the current flowing through the free spinning starting motor 15, the starting-motor circuit 25, and the closing electro-responsive means 31, will be greatly reduced. This reduction in current flow causes a decrease in the upward pull on the plunger 100. Simultaneously with this decrease, and with the decrease in the current, a rise in the battery voltage occurs, bringing it back to normal. This rise in battery voltage causes a slight increase in the current value passing through the coil 36, resulting in an increase in the pull downwardly on the plunger 100.

Now, the pull of the opening electro-responsive means 33 is sufficient to overcome the action of the spring 127 and the weakened pull of the closing electro-responsive means 31, and the result is that the plunger 100 is moved from the position shown in Figs. 1, 2, and 6, into the position shown in Fig. 7 in which the contactor disengages the spring fingers 129 and 130. The closing of the magnetic circuit by virtue of the plunger 100 moving into contact with the stationary core 96, as shown in Fig. 7, causes a complete saturation of the entire magnetic circuit of the opening electro-responsive means, and particularly the plunger 100 and the stationary core 96.

As previously explained, the adjusting screw 109 controls the air gap 111, which air gap governs the pull exerted upon the plunger 100 by the closing electro-responsive means 31, thereby definitely fixing the time of movement of the said plunger 100 in regard to the current passing through the starting motor 15, the starting-motor circuit 25, and the closing electro-responsive means 31.

The movement of the plunger downward breaks the second circuit 29 with the result that the electro-responsive means 27 is deenergized and the plunger 54 will move upward by the action of the spring 56, and the starting-motor circuit switch 26 will open, thus deenergizing the starting motor 15. Not only is the starting motor 15 deenergized, but if it were not for the utilization of the counter E. M. F. produced by the starting motor during deceleration, the starting-motor shunt coil 36 would also be deenergized and there would be a possibility of the plunger 100 moving into raised position and again closing the second circuit switch 30. This would result in a reclosing of the starting-motor switch 26 and trouble might result.

At this particular period of the operation of the device in which the starting-motor circuit switch 26 has just been opened, we may assume that the starting motor and the starting-motor shunt coil 36 are not supplied with energy from the source of energy or battery 17. Immediately the starting motor 15 decelerates, and during its deceleration, it produces counter E. M. F. and forces a current in the opposite direction than the direction of current produced by the source of energy 17. However, in view of the fact that the starting-motor switch 26 is broken, the current produced by the starting motor passes through the starting-motor shunt circuit 34 in the same direction as though it were from the battery 17, and continues the energizing of the starting-motor shunt coil 36. This current maintains the magneto-motive force in the magnetic circuit of the opening electro-responsive means, and the plunger 100 will be retained in position as shown in Fig. 7 until the starting motor comes to rest. This operation is due to the fact that just before the starting-motor circuit switch 26 is opened, practically full voltage of the battery is impressed across the starting-motor shunt coil 36 and saturates the plunger 100 and the stationary core 96. The counter E. M. F. produced by the starting motor is very small and may have a maximum of about .4 volt. This counter E. M. F., although very small, is sufficient to maintain the magneto-motive force high enough to keep the plunger 100 in depressed position.

Referring to a hysteresis curve, it will be seen that when the saturation point has been reached, the saturation of the iron may be maintained quite high, with but a small voltage.

When the engine 11 operates under its own power, the generator 23 is set into operation and a current is generated. A portion of this current passes through the circuit 35 and energizes the generator shunt coil 37 which produces a magneto-motive force quite sufficient to maintain the plunger 100 in depressed position after the starting motor 15 has come to rest. It will be seen that the counter E. M. F. of the starting motor 15 is used to maintain the second circuit switch 30 open between the time that the starting motor circuit switch 26 is opened and the generator 23 is producing sufficient current to operate the opening electro-responsive means and maintain the second circuit switch 30 open.

If the engine stalls for any reason, the generator 23 will cease to produce a current sufficient to create a magneto-motive force in the second electro-responsive means which is sufficient to maintain the plunger 100 in depressed position, and the second circuit switch 30 open. At this time the plunger 100 will move upward under the action of the spring 127, and the second circuit 29 will be complete. The electro-responsive means 27 will be energized and the starting-motor circuit switch 26 will close, the entire apparatus again operating as previously described.

Heretofore we have pointed out that a gap in the magnetic circuit is provided between the lower end of the stationary core 96 and the central part of the plunger 100 where it extends through the partition 48. The reason for this is to shorten the magnetic circuit so that the magnetizing action will be more consistent.

We have found that if the magnetic circuit is short when all the coils are deenergized, the magnetic circuit will more dependably demagnetize to a certain flux density. This will permit a more uniform action of the device and will permit a more uniform adjustment of the compression of the spring 127. We have found that when using a magnetic circuit of certain materials of approximately the proportions shown in the drawings, that the magnetic circuit will uniformly demagnetize to a definite flux density per square inch. The spring 127 may be placed under such a compression that when the density of the lines of force decreases to within range of this definite flux density, the action of the spring 127 on the plunger 100 will be sufficient to raise the plunger and cause the second circuit switch 30 to be closed.

In the operation of the device shown in Fig. 10, the action is exactly the same except with respect to the demagnetizing of the magnetic circuit of the opening electro-responsive means 33. When no current is supplied to any of the coils which magnetize the magnetic circuit, the demagnetizing coil 139 immediately demagnetizes the magnetic circuit with the result that the spring 127 will thereupon move the plunger 100 upward. In a device of this character the spring 127 will only be required to exert a force sufficient to lift the plunger 100 and operate against the weight of the plunger and any friction created in movement.

We claim as our invention:

1. In a combination of the class described: an engine; a starting motor for cranking said engine; a source of energy; a starting-motor circuit embracing said starting motor and said source of energy; means for opening and closing said starting-motor circuit; and means dependent upon rotation of said starting motor for holding said starting-motor circuit open.

2. In a combination of the class described: an engine; a starting motor for cranking said engine; a source of energy; a starting-motor circuit embracing said starting motor and said source of energy; means for opening and closing said starting-motor circuit; and means utilizing the current generated by said starting motor for holding said starting-motor circuit open.

3. In a combination of the class described: an engine; a starting motor for cranking said engine; a source of energy; a starting-motor circuit embracing said starting motor and said source of energy; means for opening and closing said starting-motor circuit; means utilizing said starting motor for holding said starting-motor circuit open; and means for holding said circuit open while said engine is operating under its own power.

4. In a combination of the class described: an engine; a starting motor for cranking said engine; a source of energy; a starting-motor circuit embracing said starting motor and said source of energy; means for opening and closing said starting-motor circuit; means utilizing the current generated by said starting motor for holding said starting-motor circuit open; and means for holding said circuit open while said engine is operating under its own power.

5. In a combination of the class described: an engine; a starting motor for cranking said engine; a source of energy; a starting-motor circuit embracing said starting motor and said source of energy; a starting-motor circuit switch for opening and closing said starting-motor circuit; means for holding said switch closed while said starting motor is cranking said engine; and means for opening said switch when the engine operates under its own power, said last-named means being operated by the current generated by said starting motor during deceleration.

6. In a combination of the class described: an engine; a starting motor for cranking said engine; a source of energy; a starting-motor circuit embracing said starting motor and said source of energy; a starting-motor circuit switch for opening and closing said starting-motor circuit; means for holding said switch closed; and means for opening said switch after said engine is operating under its own power, said last-named means operating on current taken from said starting-motor circuit, and said last-named means holding said switch open by utilizing current produced by said starting motor.

7. In a combination of the class described: an engine; a starting motor for cranking said engine; a source of energy; a starting-motor circuit embracing said starting motor and said source of energy; a starting-motor circuit switch for opening and closing said starting-motor circuit; means for holding said switch closed; and means connected to said starting motor between said switch and said starting motor for opening said switch after said engine is operating under its own power, said last-named means operating on current taken from said starting-motor circuit, and said last-named means holding said switch open by utilizing current produced by said starting motor.

8. In a combination of the class described: an engine; a starting motor for cranking said engine; a source of energy; a starting-motor circuit embracing said starting motor and said source of energy; a starting-motor circuit switch for opening and closing said starting-motor circuit; means operated by current in said starting-motor circuit for holding said switch closed; and means for opening said switch after said engine is operating under its own power, said last-named means operating on current taken from said starting-motor circuit, and said last-named means holding said switch open by utilizing current produced by said starting motor.

9. In a combination of the class described: an engine; a starting motor for cranking said engine; a source of energy; a starting-motor circuit embracing said starting motor and said source of energy; a starting-motor circuit switch for opening and closing said starting-motor circuit; means operated by current in said starting-motor circuit for holding said switch closed; and means connected to said starting motor between said switch and said starting motor for opening said switch after said engine is operating under its own power, said last-named means operating on current taken from said starting-motor circuit, and said last-named means holding said switch open by utilizing current produced by said starting motor.

10. In a combination of the class described: an engine; a starting motor for cranking said engine; a source of energy; a starting-motor circuit embracing said starting motor and said source of energy; a starting-motor circuit switch for opening and closing said starting-motor circuit; closing electro-responsive means for holding said switch closed during the cranking of said engine by said starting motor; and opening electro-responsive means for opening said switch after said engine is operating under its own power, said opening electro-responsive means being operated by current taken from said starting-motor circuit, said opening electro-responsive means being operated to hold said switch open by current produced by said starting motor.

11. In a combination of the class described: an engine; a starting motor for cranking said engine; a source of energy; a starting-motor circuit embracing said starting motor and said source of energy; a starting-motor circuit switch; electro-responsive means for opening and closing said switch; a second circuit embracing said electro-responsive means and said source of energy; means for opening and closing said second circuit for operating said electro-responsive means in order to open and close said switch; and means utilizing said starting motor for holding said second circuit open.

12. In a combination of the class described: an engine; a starting motor for cranking said engine; a source of energy; a starting-motor circuit embracing said starting motor and said source of energy; a starting-motor circuit switch; electro-responsive means for opening and closing said switch; a second circuit embracing said electro-responsive means and said source of energy; means for opening and closing said second circuit for operating said electro-responsive means in order to open and close said switch; and means utilizing the current generated by said starting motor for holding said second circuit open.

13. In a combination of the class described: an engine; a starting motor for cranking said engine; a source of energy; a starting-motor circuit embracing said starting motor and said source of energy; a starting-motor circuit switch; electro-responsive means for opening and closing said switch; a second circuit embracing said electro-responsive means and said source of energy; means for opening and closing said second circuit for operating said electro-responsive means in order to open and close said switch; means utilizing said starting motor for holding said second circuit open; and means for holding said second circuit open while said engine is operating under its own power.

14. In a combination of the class described: an engine; a starting motor for cranking said engine; a source of energy; a starting-motor circuit embracing said starting motor and said source of energy; a starting-motor circuit switch; electro-responsive means for opening and closing said switch; a second circuit embracing said electro-responsive means and said source of energy; means for opening and closing said second circuit for operating said electro-responsive means in order to open and close said switch; means utilizing the current generated by said starting motor for holding said second circuit open; and means for holding said second circuit open while said engine is operating under its own power.

15. In a combination of the class described: an engine; a starting motor for cranking said engine; a source of energy; a starting-motor circuit embracing said starting motor and said source of energy; a starting-motor circuit switch; electro-responsive means for opening and closing said switch; a second circuit embracing said electro-responsive means and said source of energy; means for holding said second circuit closed during the cranking of said engine; and means for opening said second circuit after said engine is operating under its own power, said last-named means operating on current taken from said starting motor circuit, and said last-named means holding said second circuit open by utilizing current produced by said starting motor.

16. In a combination of the class described: an engine; a starting motor for cranking said engine; a source of energy; a starting-motor circuit embracing said starting motor and said source of energy; a starting-motor circuit switch; electro-responsive means for opening and closing said switch; a second circuit embracing said electro-responsive means and said source of energy; means operated by current in said starting motor circuit for holding said second circuit closed during the cranking of said engine; and means for opening said second circuit after said engine is operating under its own power, said last-named means operating on current taken from said starting-motor circuit, and said last-named means holding said second circuit open by utilizing current produced by said starting motor.

17. In a combination of the class described: an engine; a starting motor for cranking said engine; a source of energy; a starting-motor circuit embracing said starting motor and said source of energy; a starting-motor circuit switch; electro-responsive means for opening and closing said switch; a second circuit embracing said electro-responsive means and said source of energy; closing electro-responsive means for holding said second circuit closed during the cranking of said engine by said starting motor; and opening electro-responsive means for opening said second circuit after said engine is operating under its own power, said opening electro-responsive means being operated by current taken from said starting-motor circuit, and said opening electro-responsive means being operated to hold said second circuit open by current produced by said starting motor.

18. The combination with an internal combustion engine: of a starting motor having means for rotatably engaging the crankshaft of said engine; a storage battery; a circuit embracing said starting motor and said battery; an electromagnetic switch having contacts arranged to open and close said circuit; a generator; and a control relay adapted to function under the influence of the current passing through said starting motor and the voltage created in said generator to open and close the said circuit embracing the said battery and the said starting motor.

19. In combination: an internal combustion engine; a generator driven by said engine; a starting motor embodying a means for rotatively connecting said motor and said engine and for disconnecting same after said engine has started; a source of current in circuit with said starting motor; and an electro-magnetic switch means for opening and closing said motor circuit, which means first operates to open the circuit by reason of the reduced flow of current through the starting motor after the engine has started, then operates by reason of the voltage created in said generator to maintain the circuit open, which means operates to close the circuit when the voltage decreases to zero in the said generator and motor.

20. In a combination of the class described, an engine, a starting motor for cranking said engine, a source of electrical energy, a starting motor circuit including said starting motor and said source of energy, electromagnetic means controlled by the starting current for maintaining said starting circuit closed, and electromagnetic means responsive to the voltage of the source of electrical energy for opening said starting circuit.

21. In a combination of the class described, an engine, a starting motor for cranking said engine, a source of electrical energy, a starting motor circuit including said starting motor and said source of energy, electromagnetic means controlled by the starting current for maintaining said starting circuit closed, and electromagnetic means responsive to the voltage of the source of electrical energy for opening said starting circuit, said second electromagnetic means cooperating with the starting motor to hold open the starting circuit until the motor comes substantially to rest.

22. In a combination of the class described, an engine, a starting motor for cranking said engine, a source of electrical energy, a starting motor circuit including said starting motor and said source of energy, electromagnetic means for closing the starting circuit, electromagnetic means controlled by the starting current to maintain the starting circuit closed until the engine starts, and electromagnetic means controlled by the voltage of the source of electrical energy for opening the starting circuit when the engine starts.

23. In a combination of the class described, an engine, a starting motor for cranking said engine, a source of electrical energy, a starting motor circuit including said starting motor and said source of energy, electromagnetic means for closing the starting circuit, electromagnetic means controlled by the starting current to maintain the starting circuit closed until the engine starts, and electromagnetic means controlled by the voltage of the source of electrical energy for opening the starting circuit when the engine starts, said voltage-controlled electromagnetic means being constantly connected in circuit with the starting motor and cooperating therewith to hold open the starting circuit until the motor comes substantially to rest.

24. In a combination of the class described, an engine, a starting motor for cranking said engine, a source of electrical energy, a starting motor circuit including said starting motor and said source of energy, electromagnetic means controlled by the starting current for maintaining said starting circuit closed, electromagnetic means responsive to the voltage of the source of electrical energy for opening said starting circuit, a generator, and electromagnetic means cooperating with said generator to hold open the starting circuit until the generator comes substantially to rest.

25. In a combination of the class described, an engine, a starting motor for cranking said engine, a source of energy, a starting motor circuit embracing said starting motor and said source of energy, a starting motor circuit switch, electro-responsive means for controlling said switch, a second circuit embracing said electro-responsive means and said source of energy, means for opening and closing said second circuit for operating said electro-responsive means in order to control said switch, and means for restraining the closing of the switch for a time interval after the closing of the second circuit.

26. In a combination of the class described, an engine, a starting motor for cranking said engine, a source of energy, a starting motor circuit embracing said starting motor, and said source of energy, a starting motor circuit switch, electro-responsive means for controlling said switch, a control circuit embracing said electro-responsive means and said source of energy, means responsive to self-operation of the engine for opening and closing said control circuit for operating said electro-responsive means in order to control said switch, and means for preventing reclosing of said switch for a time interval after the closing of the control circuit, in order to allow the starting motor to come substantially to rest before reenergization thereof.

27. In automatic starting mechanism for internal combustion engines, a starting circuit including a starting motor and a magnetic starting switch, and a control circuit for said starting switch including a magnetic relay, said relay having a coil connected to the starting circuit in shunt with the starting motor.

28. In automatic starting mechanism for internal combustion engines, a starting circuit including a starting motor and a magnetic starting switch, and a control circuit for said starting switch including a magnetic relay, said relay having a coil operative to cause the starting switch to be opened, said coil being connected to the starting circuit in shunt with the starting motor so as to be energized by closure of the starting switch.

29. In automatic starting mechanism for internal combustion engines, a starting circuit including a starting motor and a magnetic starting switch, and a control circuit for said starting switch including a magnetic relay, said relay having a coil operative to cause the starting switch to be opened, said coil being connected to the starting circuit in shunt with the starting motor, said relay also having a coil for preventing the opening of the starting switch by the shunt coil, said preventing coil being connected in the starting circuit in series with the starting motor.

30. In automatic starting mechanism for internal combustion engines, a starting circuit including a starting motor and a magnetic starting switch, a control circuit for said starting switch including a magnetic relay, said relay having a coil operative to cause the starting switch to be opened, said coil being connected to the starting circuit in shunt with the starting motor, said relay also having a coil operative to prevent closure of the starting switch, and means responsive to self-operation of the engine for energizing said last-named coil.

31. In automatic starting mechanism for internal combustion engines, a starting circuit including a magnetic starting switch, a control circuit for said starting switch including a magnetic relay, means for energizing said relay to cause the starting switch to be opened, and means for demagnetizing said relay.

32. In automatic starting mechanism for internal combustion engines, a starting circuit including a magnetic starting switch, and a control circuit for said starting switch including a magnetic relay, said relay having a magnetic coil operative to cause the starting switch to be opened, said relay also having a coil operative to demagnetize the relay.

33. In automatic starting mechanism for internal combustion engines, a starting circuit including a magnetic starting switch, and a control circuit for said starting switch including a magnetic relay, said relay having a pair of magnetic coils and a coil operative to demagnetize the relay when the magnetic coils are deenergized.

34. In automatic starting mechanism for internal combustion engines, a starting circuit including a magnetic starting switch, and a control circuit for said starting switch including a magnetic relay, and means for demagnetizing said relay.

35. In automatic starting mechanism for internal combustion engines, a starting circuit including a magnetic starting switch, a control circuit for said starting switch including a magnetic relay, and means including a coil operative when the relay is deenergized to destroy the remanent magnetism therein.

36. In an automatic starter for internal combustion engines, a source of electrical energy, an electric starting motor adapted for cranking connection with an engine, a motor circuit supplying current from said source to said motor, a relay adapted to make and break said motor circuit and thereby energize and arrest said motor, said relay including a first actuator normally moving it to position to energize the motor, and an electro-magnetic second actuator which, when sufficiently energized, moves the relay to position to arrest the motor, and a circuit delivering from said source, to said second actuator, current which does not pass through the motor; said second actuator being constructed to exert upon said relay, during large current consumption by the motor, a minor force that leaves the first actuator dominant and, under reduced current consumption by the motor, a major force that overcomes said first actuator and arrests the motor.

37. An automatic starter as described in claim 36, in which, also, the first actuator of the relay is electro-magnetic and this electro-magnetic first actuator is energized by current flowing from said source through a circuit that includes the motor, while the electro-magnetic second actuator is energized by current from the same source but through a circuit that does not include the motor, and the first actuator varies in force directly and the second actuator indirectly with current consumed by the motor, and the two opposing actuators thus made reciprocal in the changing forces with which they act upon the relay.

38. An automatic starter as described in claim 36 in which also the first actuator is electromagnetic in character and is energized by current drawn by the motor from the same source that energizes the second actuator independently of the motor, the magnet of the first actuator relay being wound for high amperage, and the magnet of the second actuator being wound for high voltage.

39. An automatic starter as described in claim 36 in which the motor circuit includes an electro-magnetic motor switch and the relay exerts its control over the motor, through the medium of a relay circuit which includes the winding of said switch.

40. An automatic starter as described in claim 36 in which the motor circuit includes an electro-magnetic motor switch and the relay exerts its control over the motor, through the medium of a relay circuit which includes the winding of said switch, which said relay circuit includes a voluntarily actuated switch through which to set the starter in operation.

41. In an automatic starting mechanism for internal combustion engines, a starting motor circuit including a battery, a starting motor and a magnetic starting switch, a second circuit having switch means for controlling said starting motor switch, closing means for said switch means including an electromagnetic coil in series with the starting motor, and opening means for said switch means including an electromagnetic coil in parallel with the starting motor.

42. In a combination of the class described, an engine, a starting motor for cranking said engine, a source of electric energy, a starting motor circuit including said motor and said source, an electromagnetic motor switch including a coil, a pair of contacts in series with the coil, yielding means and an electromagnet having its coil in the motor circuit for holding said contacts closed during large current flow in the motor circuit, and means including an electromagnet having its coil in shunt with the motor circuit for opening said contacts.

43. In apparatus of the class described, an engine, a starting motor for cranking said engine, a source of electrical energy, a starting motor circuit including said starting motor and said source, and means for opening the starting motor circuit and for maintaining it open during the operation of the engine, said means including means responsive to the voltage of the source of electrical energy and means responsive to a running function of the engine.

44. In an automatic starting device for internal combustion engines, a starting motor having means through which to connect it with an engine to be started, a source of electrical energy, a motor circuit including said source and said motor, a motor switch controlling said motor circuit, a motor switch magnet controlling said motor switch, a motor switch magnet circuit connecting said motor switch magnet with said source, a voluntary circuit closer controlling the last-named circuit, and means controlling said motor switch magnet circuit comprising a normally closed make and break included therein, a first relay magnet included in the motor circuit and adapted to govern the opening movement of said make and break, a second relay magnet adapted to open said make and break, and a second relay magnet circuit connecting said second relay magnet with said source.

45. An automatic starting device for internal combustion engines as described in claim 44, in which the first relay magnet is wound to cause it to act upon the make and break under the influence of high amperage in the motor circuit, and release said make and break when the amperage in the motor circuit is lowered by the running of the motor, and the second relay magnet is wound to render it responsive to high voltage in its circuit.

46. An automatic starting device for internal combustion engines as described in claim 44, in which the motor circuit and the motor switch magnet circuit have independent ground or return connections.

47. An automatic starting device for internal combustion engines as described in claim 44, in which the motor circuit and the second relay magnet circuit have independent ground or return connections.

48. An automatic starting device for internal combustion engines as described in claim 44, in which there is an engine ignition circuit branching from the motor switch magnet circuit and controlled by the voluntary circuit-closer therein, but having its own independent ground or return connection and free from other influences of said motor switch magnet circuit.

49. An automatic starter as described in claim 36 including means responsive to a running function of the engine adapted to continue the electro-magnetic second actuator in energized condition and thereby hold open the motor circuit, so long as the engine continues to run.

LESLIE K. LOEHR.
WAYNE E. BURDICK.